(12) United States Patent
Sagawa et al.

(10) Patent No.: US 7,872,099 B2
(45) Date of Patent: Jan. 18, 2011

(54) CAMERA DEVICE AND MONITOR SYSTEM

(75) Inventors: Tatsuhito Sagawa, Yokohama (JP); Makoto Kikuchi, Hitachiota (JP); Naoki Fujiwara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 768 days.

(21) Appl. No.: 11/501,845

(22) Filed: Aug. 10, 2006

(65) Prior Publication Data
US 2007/0046808 A1 Mar. 1, 2007

(51) Int. Cl.
*G03B 7/00* (2006.01)
*H04N 5/235* (2006.01)

(52) U.S. Cl. ...................... 530/333; 348/187
(58) Field of Classification Search ............... None
See application file for complete search history.

(56) References Cited

U.S. PATENT DOCUMENTS

| | | | | |
|---|---|---|---|---|
| 4,841,327 | A * | 6/1989 | Yamamoto et al. | 396/257 |
| 5,896,171 | A * | 4/1999 | Suzuki | 348/211.14 |
| 6,058,268 | A * | 5/2000 | Maeno | 396/48 |
| 6,141,499 | A * | 10/2000 | Ohmori et al. | 396/63 |
| 6,353,709 | B1 * | 3/2002 | Miyazaki et al. | 396/48 |
| 2004/0080618 | A1 * | 4/2004 | Norris et al. | 348/207.1 |
| 2005/0099509 | A1 * | 5/2005 | Kobayashi | 348/229.1 |
| 2005/0237421 | A1 * | 10/2005 | Kosugiyama | 348/360 |
| 2006/0034487 | A1 * | 2/2006 | Franz | 382/104 |
| 2006/0061664 | A1 * | 3/2006 | Ito | 348/211.11 |

FOREIGN PATENT DOCUMENTS

| | | |
|---|---|---|
| JP | 9-74553 | 3/1997 |
| JP | 2000-324480 | 11/2000 |
| JP | 2001-241346 | 9/2001 |
| JP | 2002-221066 | 8/2002 |
| JP | 2004-231010 | 8/2004 |
| JP | 2004-363846 | 12/2004 |
| JP | 2004363846 A * | 12/2004 |
| JP | 2005-073296 | 3/2005 |
| WO | WO 2004068864 A1 * | 8/2004 |

OTHER PUBLICATIONS

Cavanagh, "Canon EOS D30 Error Codes", May 11, 2001, document found at http://www.rogercavanagh.com/helpinfo/downloads/D30_Error_Codes.doc.*

* cited by examiner

*Primary Examiner*—Lin Ye
*Assistant Examiner*—Dennis Hogue
(74) *Attorney, Agent, or Firm*—Antonelli, Terry, Stout & Kraus, LLP.

(57) ABSTRACT

A camera device includes: an iris unit for varying exposure; a shutter control unit for varying a shutter speed of an imaging element; and a control unit for controlling the signal processing unit and the entire device. The camera device further includes: an exposure target calculation unit for calculating a control value used for controlling the iris unit or the shutter control unit so that an exposure amount will be a target value based on information on a signal level from a signal processing unit; and a malfunction judgment unit for determining a malfunction in the device based on information on the control value obtained by the exposure target calculation unit and the signal level from the signal processing unit.

8 Claims, 8 Drawing Sheets

★★ FAILURE INFORMATION ★★
REPORT

IRIS DRIVE CIRCUIT OF CAMERA
ID01 HAS FAILED
CONTACT THE SERVICE CENTER !!

FIG.6B

★★ FAILURE INFORMATION ★★
REPORT

LENS IRIS UNIT OF CAMERA
ID01 HAS FAILED
CONTACT THE SERVICE CENTER !!

FIG.6C

★★ FAILURE INFORMATION ★★
REPORT

CCD SENSOR OF CAMERA
ID01 HAS FAILED
CONTACT THE SERVICE CENTER !!

CAMERA DEVICE AND MONITOR SYSTEM

BACKGROUND OF THE INVENTION

1. Field of the Invention

The present invention relates to a monitor system including a monitor camera device and an image recording/reproducing device and in particular, to a technique for detecting failure of the monitor camera device.

2. Description of the Related Art

JP-A-9-74553 (Patent Document 1) is an example of the related art of the field of the invention. This invention has an object "to automatically detect imaging disturbance and take a countermeasure" and a solution as follows. "A system includes: a first monitor device 1 having a CPU 1, a ROM 2, a RAM 3, an operation processor 4, a frame memory 5, and a communication control unit 7 for imaging a monitor object by a monitor camera 6, compressing a still image of the monitor object, and transmitting it as image data; and a second monitor device 2 having a CPU 11, a ROM 12, a RAM 13, an operation processor 14, a frame memory 15, a display device 16, a communication control unit 17, and an alarm device 18 for receiving the image data from the first monitor device 1 inputted via a communication line 8, decompressing the image data to restore the still image of the monitor object, and displaying it to be monitored. If it is detected that a data amount of the image data obtained by compressing the image captured by the monitor camera 6 in the first monitor device 1 is smaller than a predetermined data amount, a message telling that something is wrong in imaging by the monitor camera 6 is displayed with alarm in the second monitor device."

SUMMARY OF THE INVENTION

Recently, as the number of crimes increases, an attention is paid on a monitor system formed by a plurality of monitor camera devices connected to an image recording/reproducing device for recording a region to be monitored. A recorded image is important because it is used for identifying a criminal. However, an image from the camera devices used in such a monitor system may fails by a mischief such as spraying a liquid or failure inside the camera devices. In this case, no image of the monitor region is recorded and it becomes impossible to check the condition of the monitor image afterwards.

In the camera device used for monitoring, a lens unit failure may be caused by failure of an exposure mechanism (iris) for controlling exposure or a shutter speed failure may be caused by failure of a CCD (Charge Coupled Device) sensor. When the exposure mechanism or the CCD sensor has failed, incident light amount becomes excessive and an image of so-called ""Wash Out"" appears, i.e., the entire image becomes white. When an image of "Wash Out" has appeared, it is necessary to detect and notify that an abnormal condition has occurred.

However, the conventional technique of the aforementioned Patent Document 1 can only recognize a uniform dark flat image such as sprayed liquid and no consideration is taken for detecting an image of "Wash Out" Furthermore, when an image is flat, an abnormal condition is detected even if the image is in a normal state. That is, the detection accuracy is low. These problems reduce the reliability of the camera device.

It is therefore an object of the present invention to provide a camera device and a monitor system capable of improving reliability.

In order to achieve the aforementioned object, the camera device according to the present invention includes: an iris unit for varying the incident light amount; a shutter control unit for varying the shutter speed of an imaging element; a signal processing unit for processing an image signal from the imaging element; an exposure target calculation unit for calculating a control value for controlling the iris unit or the shutter control unit based on information on the signal level from the signal processing unit so that the exposure light amount will be a target value; and an abnormal state judgment unit for judging whether the state is abnormal according to the control value by the exposure target calculation unit and the information on the signal level from the signal processing unit.

Moreover, in order to achieve the aforementioned object, the monitor system according to the present invention includes: a camera device for detecting a malfunction of the iris unit for varying the incident light amount or the shutter control unit for varying the shutter speed of the imaging element and reporting the malfunction information; and a monitor device for receiving the malfunction information from the camera device. Furthermore, the monitor device has a malfunction information detection unit for detecting malfunction information, a malfunction position judgment unit for specifying a malfunction position from the malfunction information, and a malfunction report unit for reporting the malfunction. When malfunction is detected by the malfunction information detection unit, the malfunction report unit reports it outside.

According to the present invention, it is possible to improve reliability of the camera device and the monitor system.

Other objects, characteristics, and merits of the present invention will be clear from the description of embodiments of the present invention with reference to the attached drawings.

DESCRIPTION OF THE EMBODIMENTS

Description will now be directed to an embodiment of the monitor system according to the present invention with reference to FIGS. 1 to 8. It should be noted that in this embodiment, the image signal complies with the NTSC scheme and the burst signal in color signals has frequency normally set to 3.58 MHz.

1. Embodiment 1

Explanation will be given on a monitor system according to a first embodiment of the present invention with reference to FIGS. 1 to 6.

Figure 1:
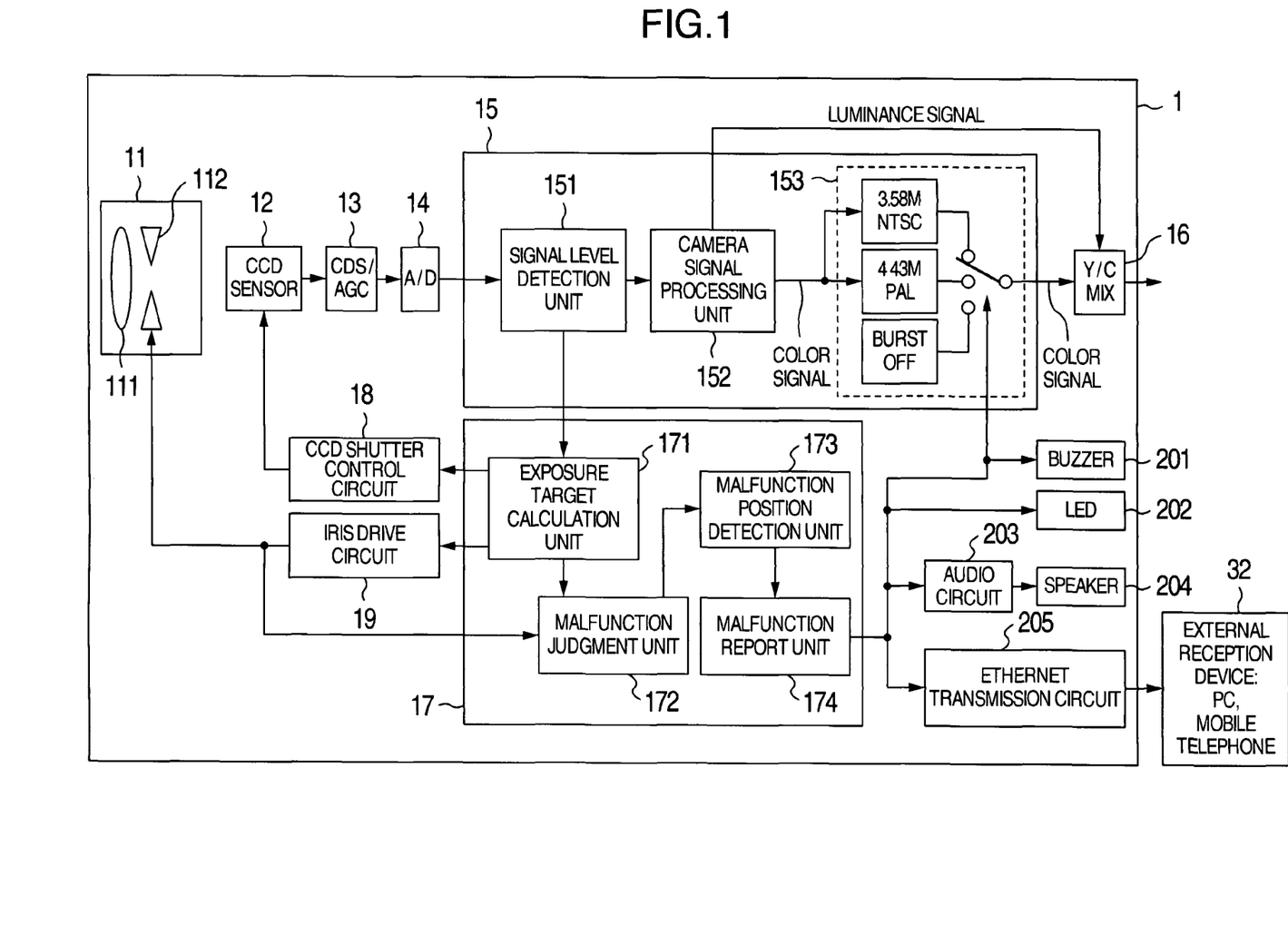
FIG. 1 is a block diagram of a monitor camera device according to the present invention.

Firstly, explanation will be given on the configuration and the outline of the operation of the monitor camera device according to the present invention with reference to FIG. 1. FIG. 1 is a block diagram of the monitor camera device according to the present invention.

1 denotes the monitor camera device; 11 denotes a lens iris as a iris mechanism formed by a lens 111 and an iris open/close unit 112 for opening and closing the iris so as to vary the exposure; 12 denotes a an imaging element such as a CCD sensor; 13 denotes a CDS/AGC for sampling an image signal from the CCD sensor 12 and performing automatic gain control; 14 denotes an A/D converter for converting an analog image signal into a digital image signal; 15 denotes a signal DSP (Digital Signal Processor) for performing various signal processes such as separation of the image signal into a luminance signal and a color signal; 16 denotes a Y/CMIX for mixing the signals separated into the luminance signal and the color signal by the signal processing DSP 15; 17 denotes a microcomputer as a control unit for controlling the entire monitor camera device 1 and detecting malfunction information; 18 denotes a CCD shutter control circuit as a shutter control unit for varying/controlling the shutter speed of the CCD sensor 12; and 19 denotes an iris drive circuit for varying/controlling the lens iris unit 11. Moreover, the monitor camera device 1 according to the present embodiment includes a buzzer 201 and an LED (Light Emitting Diode) 202 for reporting a malfunction by the monitor camera device itself upon detection of the malfunction by the microcomputer 17 and an audio circuit 203 for reporting by audio from a speaker 204 and an Ethernet transmission circuit 205 for transmitting the malfunction information to an external reception device 32 such as a PC and a mobile telephone via the Ethernet and a general line. Furthermore, the signal processing DSP 15 includes a signal level detection unit 151 for detecting the signal level of the image signal, a camera signal processing unit 152 for performing various signal processes such as separation into a luminance signal and a color signal, and a color encode unit 153 for switching the burst signal in the color signals by the malfunction information detected by the microcomputer 17 and reporting it as malfunction information. Moreover, the microcomputer 17 consists of: an exposure target calculation unit 171 for calculating a control value for controlling the lens iris unit 11, the iris drive circuit 19, and the CCD shutter control circuit 18 so that the exposure will be set to a target value based on the information on the signal level from the signal level detection unit 151; a malfunction judgment unit 172 to judge whether the monitor camera device is in an abnormal state according to the control value obtained by the exposure target value calculation unit 171 and information on the signal level from the signal level detection unit 151; a malfunction position detection unit 173 for specifying the malfunction position; and a malfunction report unit 174 for reporting the malfunction information and the malfunction position information.

Here, explanation will be given on the outline of the malfunction detection operation according to the present invention.

Firstly, in a normal state, an image signal of an object captured via the lens iris unit 11 to the CCD sensor 12 is inputted as a digital image signal via the CDS/AGTC 13 and the A/D 14 to the signal level detection unit 151. According to the signal level information from the signal level detection unit 151, the exposure target calculation unit 171 calculates such an iris control value or a shutter speed control that the image signal level will be at a predetermined level and controls the open/close degree of the iris open/close unit 112 by the iris drive unit 19 or the shutter speed of the CCD sensor 12 by the shutter control circuit 18, so as to obtain a target exposure. On the other hand, the image signal introduced via the signal level detection unit 151 is separated into the luminance signal and the color signal by the camera signal processing unit 152 and is performed with various signal processes. The color encode unit 153 adds a burst signal depending on the malfunction information to the color signal variously processed in the camera signal processing unit 152. The color signal is then mixed with the luminance signal by the Y/CMIX 16 to become an image signal, which is transmitted to the monitor device.

Next, explanation will be given on a case when the lens iris unit 11 or the iris drive circuit 19 has failed to cause an abnormal state. When the lens iris unit 11 or the iris drive circuit 19 has failed and the iris open/close unit 112 cannot be closed to cause an entirely bright image and a large signal level, the exposure target calculation unit 171 sends an iris control value for closing the iris open/close unit 112 to the iris drive circuit 19. However, when the iris open/close unit 112 or the iris drive circuit 19 has failed, the iris open/close unit 112 cannot be closed and "Wash Out" is caused in the image. Here, because of the image of "Wash Out", the signal level from the signal level detection unit 151 is higher than the predetermined value and the iris control value is to close the iris open/close unit 112. It is judged that this state is out of the normal control range and the malfunction judgment unit 172 judges that a malfunction has occurred and the malfunction position detection unit 173 specifies that the lens iris unit 11 or the iris drive circuit 19 has failed. Furthermore, since the output of the iris drive circuit 19 is detected, if the output of the iris drive circuit 19 (drive voltage of the lens iris unit 11) is not the target value for the iris control value, it is possible to judge that the iris drive circuit 19 has failed and if the iris drive circuit 19 has not failed, it is possible to judge that the lens iris unit 11 has failed. According to the information on the malfunction position specified by the malfunction position detection unit 173, the malfunction report unit 174 controls the color encoder unit 153 as follows. If the iris drive circuit 19 has failed, the frequency of the burst signal in the color signal is switched from 3.58 MHz of the NTSC scheme to 4.43 MHz of the PAL scheme. If the lens iris unit 11 has failed, the burst signal is turned OFF and malfunction information is sent to the monitor device side. The monitor device side detects the burst signal in the color signal and performs an alarm display in accordance with the failure position together with the identifier of the monitor camera which has failed to report the failure to an administrator.

Simultaneously with switching of the burst signal in the color signal, the malfunction report unit 174 reports the malfunction by changing the volume or level of the buzzer 201 and ON/OFF repetition, by changing the brightness, the color, and the flashing cycle of the LED 202, and by performing audio guide about the malfunction occurrence and the malfunction position from the speaker 204 according to the failure position information. Thus, the monitor camera device itself reports the malfunction and a person in the vicinity of the camera can also know the malfunction and can rapidly take a countermeasure. Furthermore, the malfunction information and the malfunction position information are transmitted to a destination of the external reception device 32 such as a preset PC and a mobile telephone via the Ethernet transmission circuit 205. The administrator can know the malfunction at a remote place via the PC or the mobile telephone and can rapidly take a countermeasure.

Explanation will be given on a case when the CCD sensor 12 has failed to cause an abnormal state. When the CCD sensor 12 has failed, the shutter speed cannot increase and the entire image becomes bright and the signal level becomes large. For this, the exposure target calculation unit 171 sends a shutter control value to increase the shutter speed to the shutter control circuit 18. However, since the CCD sensor 12 has failed, the shutter speed does not reach the maximum speed and "Wash Out" occurs in the image. Here, because of the image of "Wash Out", the signal level from the signal level detection unit 151 is higher than the predetermined threshold value and the shutter control value indicates a maximum speed. Since it is judged that this state is out of the normal control range, the malfunction judgment unit 172 judges that a failure has occurred and the malfunction position detection unit 173 judges that the CCD sensor 12 has failed. The malfunction report unit 174 controls the color encoder unit 153 to periodically turn ON/OFF the burst signal in the color signal, thereby sending malfunction information to the monitor device side. The monitor device side detects that the burst signal in the color signal periodically turns ON/OFF and performs an alarm display on the screen together with the identifier of the monitor camera which has failed to notify the administrator. It should be noted that failure of the CCD shutter control circuit 18 includes the failure of the CCD sensor 12.

Simultaneously with the periodic ON/OFF of the burst signal in the color signal, the malfunction report unit 174 reports the malfunction occurrence and the malfunction position by using the buzzer 201, the LED 202, and the speaker 204 according to the malfunction position information. Furthermore, the failure information and the malfunction position information are transmitted to a preset destination such as a PC and a mobile telephone via the Ethernet transmission circuit 205. The administrator can rapidly know the malfunction at a remote place via the PC or the mobile telephone and rapidly take a countermeasure.

Figure 2:
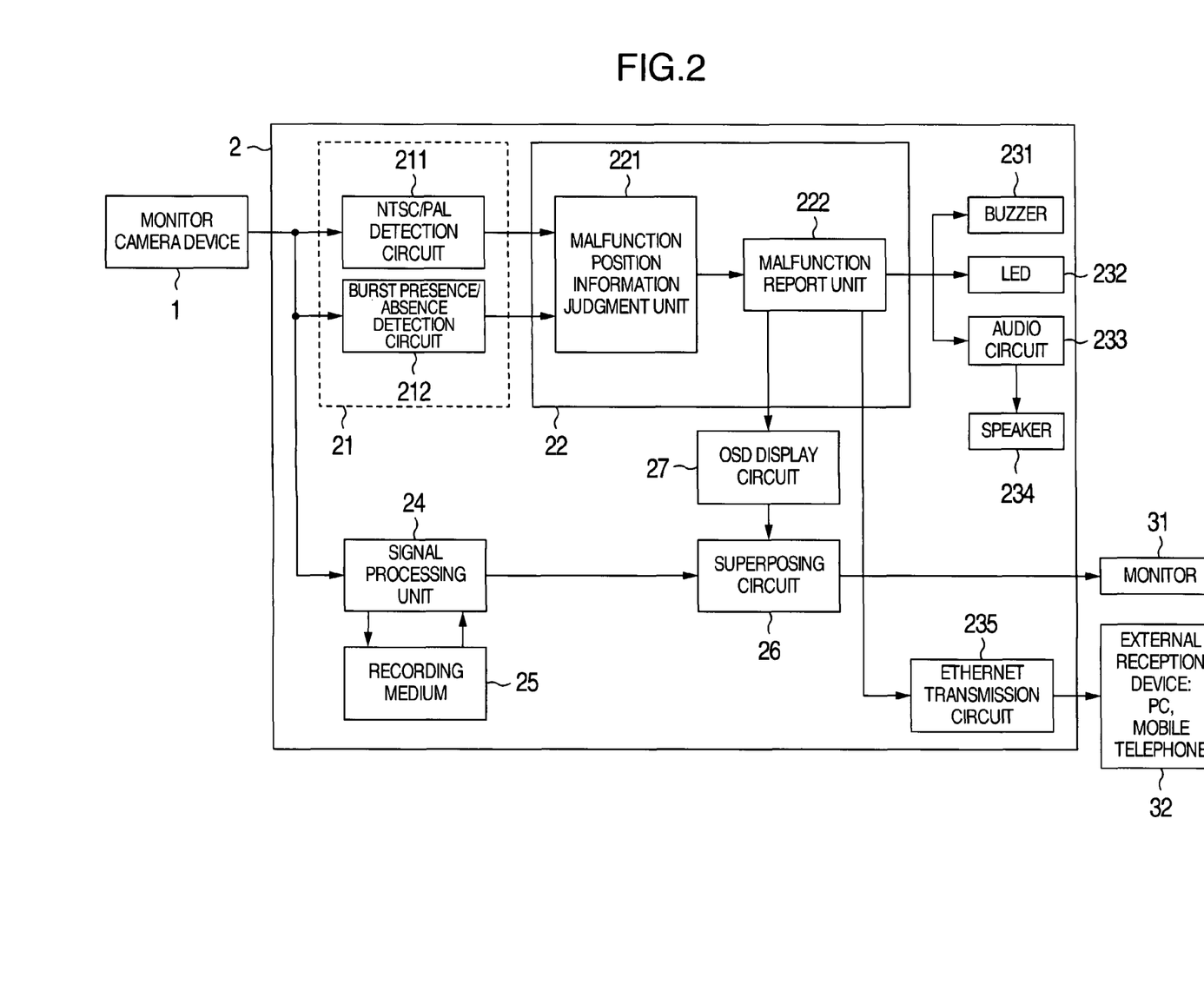
FIG. 2 is a block diagram of a monitor system according to the present invention.

Next, explanation will be given on the configuration and operation of the monitor system according to the present invention with reference to FIG. 2. FIG. 2 is a block diagram of the monitor system according to the present invention.

2 denotes a monitor device for recording an image signal from the monitor camera device 1 and reporting malfunction information to an administrator; 21 denotes a burst detection unit which is a malfunction information detection unit for detecting a burst signal in the color signal; 22 denotes a control unit including a malfunction information judgment unit 221 for specifying a malfunction position according to the burst signal information detected by the burst detection unit 21 and a malfunction report unit 222 for controlling the buzzer 231 and the OSD display content according to the malfunction information; 231 denotes a buzzer for reporting the malfunction by audio; 232 denotes an LED for reporting the malfunction by light emission; 234 denotes a speaker driven by an audio circuit 233 to report the malfunction by audio; 235 denotes an Ethernet transmission circuit for transmitting the malfunction information via the Ethernet or the general line to the external reception device 32 such as a PC and a mobile telephone; 24 denotes a signal processing unit for recording an image signal transmitted from the monitor camera device 1 or reproducing the image data from the recording medium; 26 denotes a superposing circuit for superposing the OSD display information generated by the OSD display circuit 27 on the image signal from the signal processing unit 24 by control of the malfunction report unit 222; and 31 denotes a monitor for displaying an image from the monitor device 2 and OSD such as an alarm. Furthermore, the burst judgment unit 21 is formed by an NTSC/PAL detection circuit 211 and a burst presence/absence detection circuit 212 for detecting presence/absence of a burst signal.

Here, brief explanation will be given on the outline of the operation for reporting a malfunction to an administrator upon detection of the malfunction. The monitor camera device 1 transmits a color burst signal while switching it depending on the malfunction position and the burst detection unit 21 detects the content of the burst signal. When the burst signal frequency is switched from the normal 3.58 MHz to 4.43 MHz, this is detected by the NTSC/PAL detection circuit 211. The burst signal OFF and the periodic ON/OFF of the burst signal are detected by the burst presence/absence detection circuit 212. According to the detection result by the burst detection unit 21, the malfunction position information judgment unit 221 specifies a malfunction position. When the frequency of the burst signal is 3.58 MHz, the monitor camera device 1 is in the normal state without any malfunction. When the frequency of the burst signal is 4.43 MHz, it is judged that the drive circuit 19 is in an abnormal state. When the burst signal is in the OFF state, it is judged that the lens iris unit 11 is in an abnormal state. When the burst signal ON/OFF is caused periodically, it is judged that the CCD sensor 12 is in an abnormal state. According to the judgment result information and the identifier of the monitor camera device recognized by the control unit 22, the OSD display circuit 27 is controlled by the malfunction report unit 222 so as to display the identifier of the monitor camera where the failure has occurred and the failure position on the screen of the monitor 3 via the superposition circuit 26 for the administrator. Simultaneously with this display, the volume and the level of the buzzer 231 and ON/OFF repetition are changed for reporting the malfunction. The brightness, the color, the flashing period of the LED 232 are changed for reporting the malfunction. The audio guide for the malfunction occurrence and the malfunction position is performed by audio from the speaker 234. Furthermore, the malfunction information, the malfunction position information, and the identifier of the camera which has failed are transmitted to a preset destination such as a PC and a mobile telephone by the Ethernet transmission circuit 235. The administrator can know the malfunction via the PC or the mobile telephone at a remote place and ca rapidly take a countermeasure.

It should be noted that the embodiment has been explained with assumption that only one monitor camera device 1 is connected to the monitor device 2. However, a plurality of monitor camera devices may also be connected and input to the burst detection unit and the signal processing unit 24 may be performed by using a switching circuit.

Figure 3:
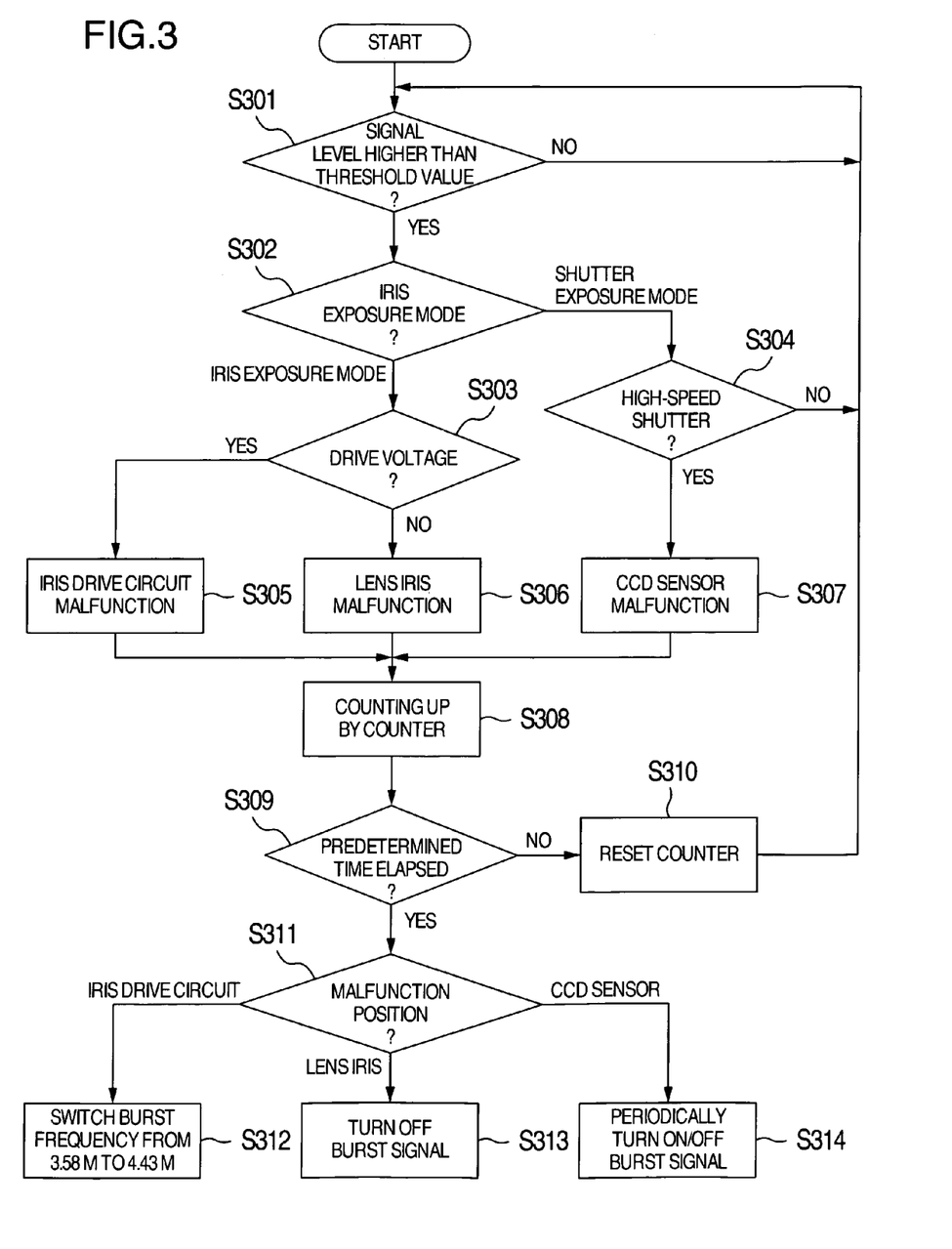
FIG. 3 is a flowchart of a malfunction detection process performed by the monitor camera device according to the present invention.
Figure 4:
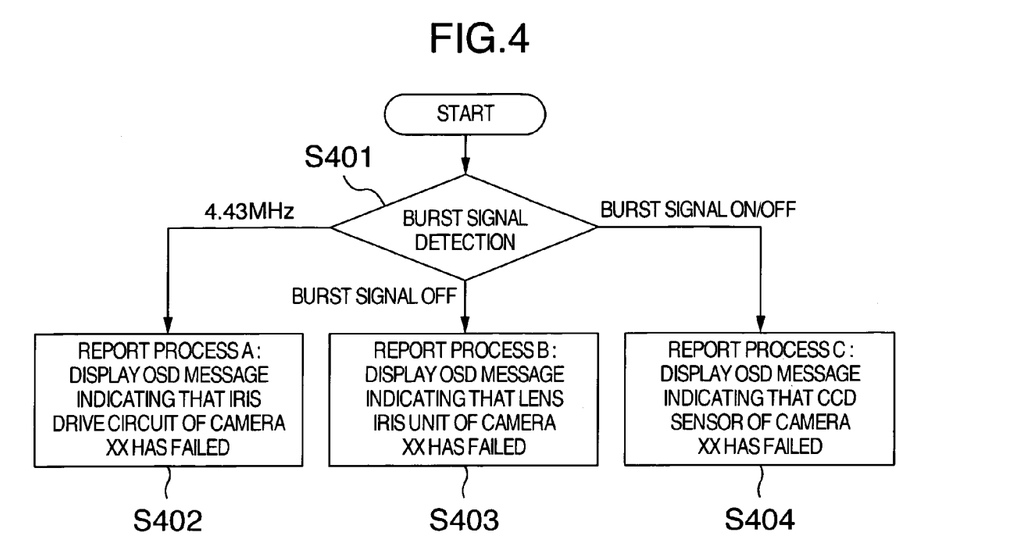
FIG. 4 is a flowchart of a malfunction report process of the monitor device according to the present invention.

Next, explanation will be given on the flow of malfunction detection process and the malfunction report process in the monitor camera device 1 and the monitor device 2 with reference to FIG. 3 and FIG. 4. FIG. 3 is a flowchart of the malfunction detection process performed by the monitor camera device in the present invention. FIG. 4 is a flowchart of the malfunction report process performed by the monitor device in the present invention.

The monitor camera device 1 in the imaging state monitors information on the signal level from the signal level detection unit 151 and judges whether the signal level is higher than a predetermined threshold value in step S301. If the signal level is equal to the signal for the exposure target, control is returned to step S301 for monitoring the signal level. If the signal level is higher than predetermined threshold value in step S301, it is judged that "Wash Out" has occurred in the screen. Accordingly, it is judged in step S302 whether the mode is the iris exposure mode or the shutter exposure mode. If the mode is the iris exposure mode, control is passed to step S303 for judging whether the drive voltage of the lens iris unit 11 as an output from the iris circuit 19 is the target value. If the voltage is not the target value, control is passed to step S305, where it is judged that the iris drive circuit 19 is in an abnormal state. If it is judged in step S303 that the drive voltage is the target value, it is judged that the lens iris unit 11 is in an abnormal state because the signal level is high in spite of that the iris control value is a control value for the closed state more than the threshold value (for example, the control value is not for the open state). When it is decided in step S302 that the mode is the shutter exposure mode, it is judged that the CCD sensor 12 is in abnormal state because the signal level is high in spite of that in step S304, and the shutter speed control value is a value faster than a predetermined threshold value (for example, the control value is in the state of the maximum speed).

After this, in step S308, a counter starts counting to decide whether the abnormal state has continued for a predetermined time (such as 1 minute) and step S309 decides whether the predetermined time (such as 1 minute) has elapsed. If the abnormal state has not continued for a predetermined time, control is passed to step S310 where the counter is reset and then control is returned to step S301 for monitoring the signal level.

If it is decided in step S309 that the abnormal state has continue for a predetermined time, the malfunction position is specified in step S311. After this, according to the malfunction position specified in steps S305, S306, and S307, if it is judged that the iris drive circuit 19 is in an abnormal state, the frequency of the burst signal is switched from 3.58 MHz to 4.43 MHz; if the lens iris unit 11 is judged to be in an abnormal state, step S313 turns OFF the burst signal; and if the CCD sensor 12 is judged to be in an abnormal state, step S314 periodically turns ON/OFF the burst signal. That is, in this embodiment, the burst signal in the color signal is used as malfunction information, which is mixed with the luminance signal and transmitted as an image signal to the monitor device 2.

Moreover, as has been explained with reference to FIG. 1, according to the failure information, simultaneously with the process of S312, S313 and S314, the volume and the level of the buzzer 201 and ON/OFF repetition are changed and the brightness, the color, and the flashing period of the LED 202 are changed. An audio guide about the malfunction occurrence and the malfunction position is also performed by audio from the speaker 204. Thus, the monitor camera device itself reports the malfunction and a person in the vicinity of the camera can also know the malfunction and rapidly take a countermeasure. Furthermore, information such as the malfunction information and the malfunction position information is transmitted to a preset destination such as a PC and a mobile telephone by the Ethernet transmission circuit 205. The administrator can know the malfunction via the PC and the mobile telephone at a remote plate and can rapidly take a countermeasure.

In step S401, the monitor device 2 detects the content of the burst signal in the image signal transmitted from the monitor camera device 1. When the burst signal frequency is 4.43 MHz, the monitor device 2 performs in step S402, on the screen of monitor 3, OSD display that the iris drive circuit of the camera of identifier xx has failed as malfunction report process A. When the burst signal is OFF, the monitor device 2 performs in step S403, on the screen of monitor 3, OSD display that the lens iris unit of the camera of identifier X has failed as malfunction report process B. When the burst signal periodically repeats ON/OFF, the monitor device 2 perform in step S404, on the screen of monitor 3, OSD display that the CCD sensor of the camera of identifier xx has failed as malfunction report process C. According to the display on the screen of the monitor 3, the administrator can know which monitor camera device is in an abnormal state and rapidly take a countermeasure for the monitor camera device in the abnormal state.

Figure 5A:
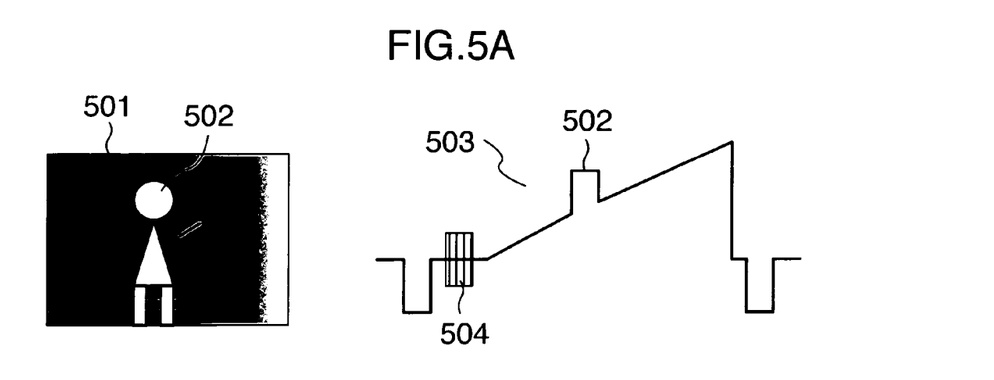
FIGS. 5A and 5B are brief diagrams showing screen examples and image signals.
Figure 5B:
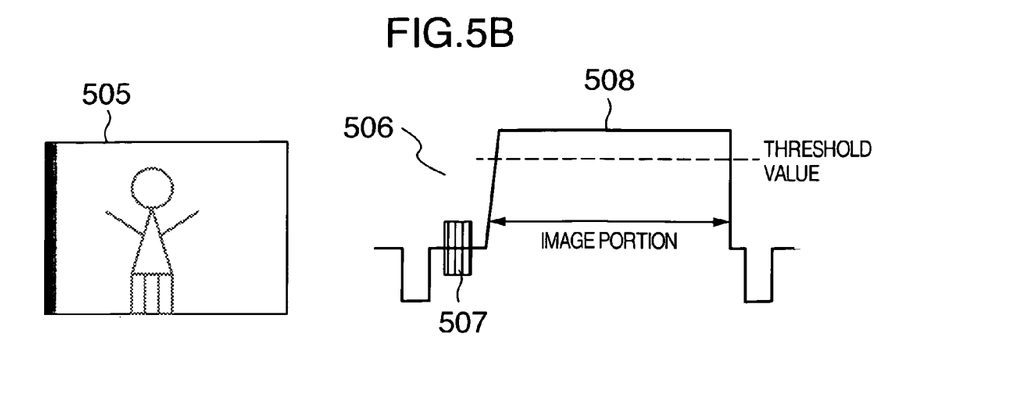

Explanation will be given on the image signal inputted to the signal processing DSP 15 with reference to FIGS. 5A and 5B. FIG. 5A shows a screen example and brief diagram of the image signal in the normal state. FIG. 5B shows an screen example and brief diagram of the image signal when a malfunction has occurred. In this case, the object is a person with the background having black left half and white right half.

The screen 501 in the normal state shown in FIG. 5A shows a person having a head 502 with the background which is black at the left half and white toward the right side of the screen. In this case, the image signal 503 includes a burst signal 504 for colour after the synchronization signal and the signal 502 corresponding to the head of the person is present in the middle of the obliquely increasing signal in the image portion. In this state, the exposure control by the microcomputer 17 is performed normally and the target signal level is obtained.

On the screen 505 in the abnormal state shown in FIG. 5B, "Wash Out" occurred and the person cannot be recognized. In this case, the image signal 506 has the burst signal 504 for color after the synchronization signal and the entire image portion 508 is a large level signal of white 100%.

Here, when the level of the image portion 508 is compared the preset threshold value, the level of the image portion 508 is higher and accordingly, it is judged that the monitor camera device 1 may be in an abnormal state and as has been explained with reference to FIG. 3, check operation is performed to decide whether the lens iris unit 11 or the CCD sensor 12 operates without any malfunction. Thus, not only by using the signal level of the image signal, but by checking whether the exposure iris control value and the shutter speed control value for the shutter speed are not abnormal values, it is possible to improve the malfunction detection accuracy. Moreover, even when the image signal is in an abnormal state, the burst signal is added to a position other than the image portion by the color encode portion 16 and accordingly, the signal information is not lost and can be detected by the monitor device 2.

Figure 6A:
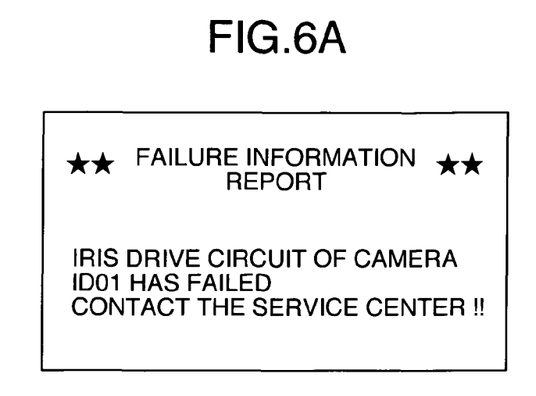
FIGS. 6A, 6B, and 6C show display examples when an alarm has occurred.
Figure 6B:
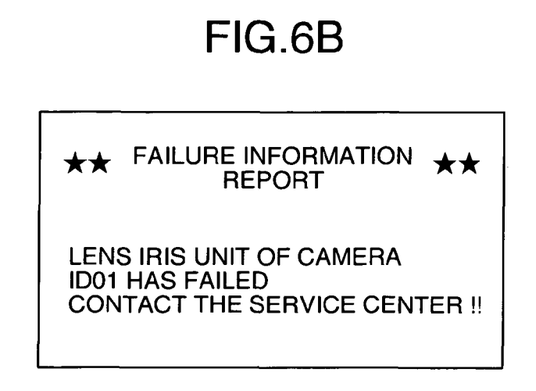
Figure 6C:
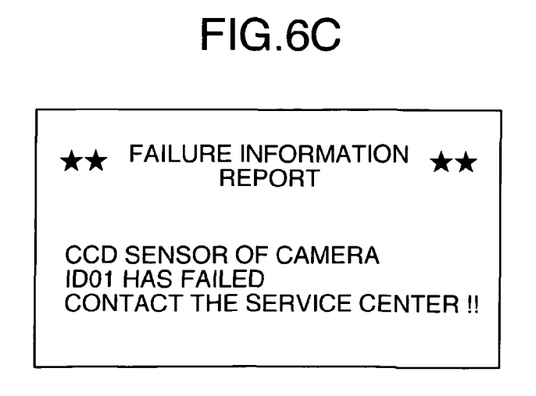

Screen display examples in steps S402, S403, and S404 upon malfunction report will be explained with reference to FIG. 6A, FIG. 6B, and FIG. 6C. FIG. 6A shows a display example upon malfunction report A in the present invention. FIG. 6B shows a display example upon malfunction report B in the present invention. 6C shows a display example upon malfunction report C in the present invention. It should be noted that explanation will be given here in the case when the identifier of the monitor camera device is "01".

As shown in FIG. 6A, when the iris drive circuit 19 is in an abnormal state, the screen displays an OSD message "Failure information report "Drive circuit of Camera ID 01 has failed. Contact service center!!"" As shown in FIG. 6B, when the lens iris unit 11 is in an abnormal state, the screen displays an OSD message "Failure information report "Lens iris unit of Camera ID 01 has failed. Contact service center!!"" As shown in FIG. 6C, when the CCD sensor 112 is in an abnormal state, the screen displays an OSD message "Failure information report "CCD sensor 12 of Camera ID 01 has failed. Contact service center!!"" Thus, the malfunction position where the malfunction has occurred and the identifier (ID number) of the monitor camera is reported by the OSD message to the administrator. The administrator can know which monitor camera is in an abnormal state and rapidly take a countermeasure for the monitor camera in the abnormal state.

2. Embodiment 2

Figure 7:
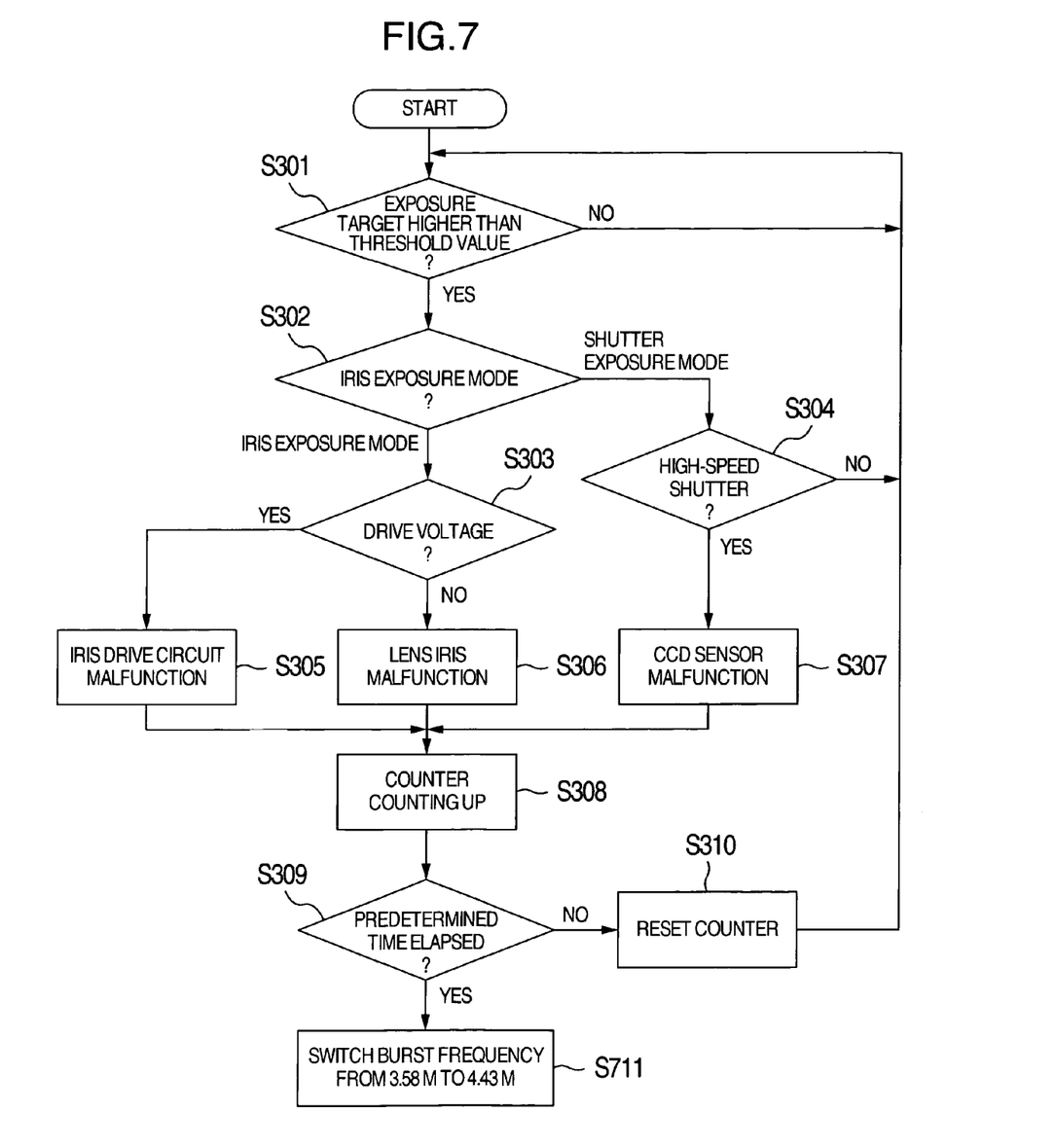
FIG. 7 is a flowchart of a malfunction detection process of the monitor camera device according to a second embodiment of the present invention.
Figure 8:
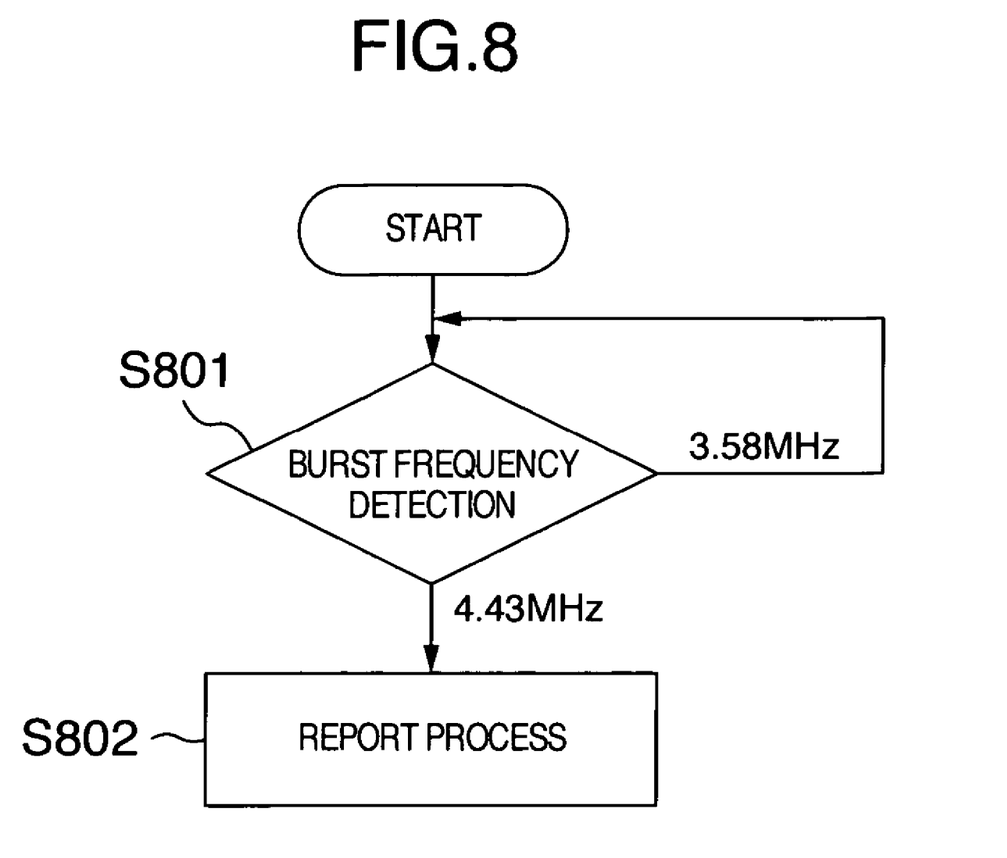
FIG. 8 is a flowchart of a malfunction report process of the monitor device according to the second embodiment of the present invention.

Explanation will be given on a monitor system according to a second embodiment of the present invention with reference to FIG. 7 and FIG. 8. In the Embodiment 1, the monitor camera device detects a malfunction and a malfunction position and, the monitor device reports according to the malfunction position information the identifier of the monitor camera and the malfunction position to the display screen. In the Embodiment 2, the monitor camera device detects a malfunction occurrence and the monitor device reports that the monitor camera device has failed.

The malfunction detection process and the malfunction report process in the monitor camera 1 and the monitor device 2 will be explained with reference to FIG. 7 and FIG. 8. FIG. 7 is a flowchart of the malfunction detection process of the monitor camera device according to the second embodiment of the present invention. FIG. 8 is a flowchart of the malfunction report process of the monitor device according to the second embodiment of the present invention.

The monitor camera device 1 in the imaging state monitors signal level information from the signal level detection unit 151 in step S301 to judge whether the signal level is higher than a predetermined threshold value and performs S309 and S310. The operations performed here are identical to steps S301 to S310 in FIG. 3 and their explanations are omitted.

If it is decided in step S309 that an abnormal state has continued for a predetermined time, the burst signal frequency is switched from 3.58 MHz to 4.43 MHz and the burst signal as malfunction information is mixed with the luminance signal, and the mixed signal is transmitted as an image signal to the monitor device 2 in step S711.

When the monitor device 2 detects that the frequency of the burst signal in the image signal transmitted from the monitor camera device 1 is 4.43 MHz in step S801, it displays an OSD message that the camera ID xx has failed on the screen of the monitor 3 as a malfunction report process in step S802. According to this screen, the administrator can know which camera device is in an abnormal sate and rapidly take a countermeasure for the monitor camera in the abnormal state.

3. Embodiment 3

Figure 9:
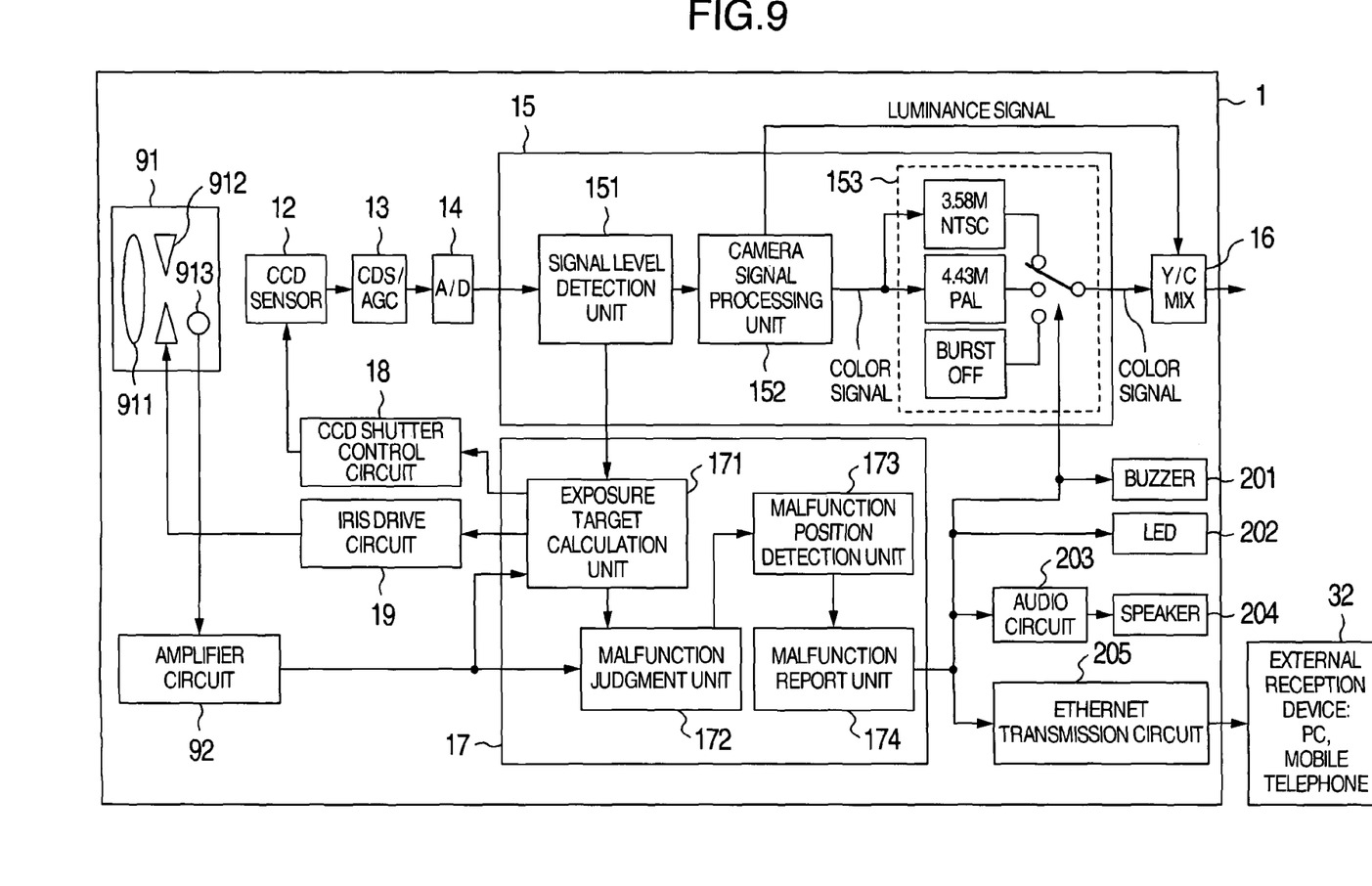
FIG. 9 is a block diagram of the monitor camera device according to a third embodiment of the present invention.

Explanation will be given on a monitor camera device according to a third embodiment of the present invention with reference to FIG. 9. In the first embodiment, when judging the malfunction of the iris unit of the monitor camera device, a malfunction of the iris drive circuit 19 is specified by detecting the output of the iris drive circuit 19 (drive voltage of the lens iris 11). In the third embodiment, a malfunction of the lens iris unit (iris open/close unit) is specified by using a hall element capable of detecting the open/close state of the iris open/close unit in the lens iris unit of the monitor camera device. Here, explanation will be given on the operation for specifying a malfunction position by detecting the malfunction of the iris unit which is different from the first embodiment and explanation on the other portions identical to the first embodiment is omitted.

When the lens iris unit 91 or the iris drive circuit 19 has failed, the iris open/close circuit 912 cannot be closed, the entire image has become bright, and the signal level of the image signal has become large. In this case, the exposure target calculation unit 171 sends a iris control value to close the iris open/close unit 912 to the iris drive circuit 19. However, if the iris open/close unit 012 or the iris drive circuit 19 has failed, the iris open/close unit 912 cannot be closed and "Wash Out" occurs in the image. Here, because of the image of "Wash Out", the signal level from the signal level detection unit 151 is higher than a predetermined threshold value and the iris control value is for closing. Since this state is judged to be out of the normal control range, the malfunction judgment unit 172 decides that a malfunction has occurred and the malfunction position detection unit 173 decided that the lens iris unit 91 or the iris drive circuit 19 has failed. Furthermore, the output from the hall element 913 which detects the open/close state of the iris open/close unit 912 has been detected via the amplifier circuit 92. If the open/close value is not the target value with respect to the iris control value, it is possible to decide that the lens iris unit 91 has failed. If the lens iris unit 91 has not failed, it is possible to decide that the iris drive circuit 19 has failed. After a malfunction position is specified, the malfunction report unit 174 performs the malfunction position report operation in the same way as in the first embodiment.

According to the respective embodiments thus far explained, it is possible to detect the image of "Wash Out", improve the detection accuracy, and improve the reliability of the camera device and the monitor system.

Especially, the camera device according to an embodiment of the present invention includes a iris unit for varying exposure, a shutter control unit for varying the shutter speed of imaging element, a signal processing unit for processing an image signal from the imaging element, and a control unit for controlling the signal processing unit and the entire device. The camera device further includes: an exposure target calculation unit for calculating a control value for controlling the iris unit or the shutter control unit so that the exposure will be a target value according to the signal level information from the signal processing unit; and a malfunction judgment unit for judging the malfunction of the device according to information on the control value obtained by the exposure target calculation unit and the signal level from the signal processing unit. Thus, when the iris is not in the open state and the signal level is high or when the shutter control value is at a high speed state and the signal level is high, the malfunction is judged, thereby detecting an image of "Wash Out" and improving the detection accuracy.

Furthermore, the control value obtained by the exposure target calculation unit is a iris control value for controlling the iris unit and/or the shutter speed control value for controlling the shutter control unit. When the signal level from the signal processing unit is higher than a predetermined level threshold value, the malfunction judgment unit compares the iris control value to a predetermined iris threshold value, thereby deciding the malfunction of the iris unit and compares the shutter speed control value to a predetermined shutter speed threshold value, thereby deciding the malfunction of the shutter control unit. Thus, when the signal level is high and the iris control value and the shutter speed control value are higher than predetermined threshold values, it can be judged that an abnormal state is present.

Furthermore, the iris unit consists of an iris mechanism unit and an iris drive circuit. The malfunction judgment unit detects information on the output value of the iris drive circuit and judges the malfunction of the iris drive circuit according to the iris control value and the output value of the iris drive circuit. Thereby, the malfunction of the iris drive circuit can be detected.

Furthermore, a report unit is provided for reporting malfunction information judged to be as a malfunction. When it is judged that a malfunction has occurred, the malfunction information is reported to the monitor device, from which the malfunction is reported to the administrator.

Furthermore, a unit or circuit judged to be in an abnormal state is specified and malfunction information corresponding to the unit or circuit in the abnormal state is reported by the report unit. This increases the convenience since the position where a malfunction has occurred is known and there is no need of searching the malfunction position upon maintenance.

Furthermore, the monitor system includes a monitor device for receiving a video signal and the malfunction information from the camera device. The monitor device includes a malfunction information detection unit for detecting the malfunction information, a malfunction position identification unit for specifying the malfunction position from the malfunction information, and a malfunction report unit for reporting the malfunction. When a malfunction is detected by the malfunction information detection unit, it is reported by the malfunction report unit. This enables the administrator to know the malfunction through an alarm display on the monitor connected to the monitor device or audio information such as a buzzer.

Furthermore, when it is judged that the camera device is in an abnormal state, the frequency of the color burst signal in the image signal is changed from a first frequency to a second frequency or the burst signal is switched ON/OFF, thereby the malfunction information is reported to the monitor device. In the monitor device, the malfunction information recognition unit detects that the first frequency is switched to the second frequency or the burst signal is present or absent and the malfunction report unit reports it outside. Thus, malfunction information can be transmitted while being superposed on the image signal. Accordingly, there is no need of increasing the connection for malfunction information which may increase the cost. Furthermore, the conventionally mounted NTSC/PAL detection circuit can be used as the malfunction information recognition unit and it is possible to suppress the increase of the cost of the monitor device.

The present invention has been thus far described according to the specific embodiments. However, the present invention may be modified and corrected in various ways without departing from the spirit of the invention within the range of claims.

The invention claimed is:

1. A camera device comprising:
   iris means for varying an incident light amount;
   shutter control means for varying a shutter speed of an imaging element;
   signal processing means for processing an image signal from the imaging element;
   exposure target calculation means for calculating a control value used for controlling the iris means or the shutter control means so that an exposure amount will be a target value according to information on a signal level from the signal processing means;
   malfunction judgment means for deciding that a malfunction has occurred when the signal level from the signal processing means is higher than a predetermined level threshold and the control value calculated by the exposure target calculation means is out of a normal control range defined by a predetermined threshold value, for more than a predetermined time period; and
   wherein the control value obtained by the exposure target calculation means is an iris control value for controlling the iris means or a shutter speed control value for controlling the shutter control means,
   wherein, when the signal level from the signal processing means is higher than a predetermined level threshold value,
   the malfunction judgment means compares the iris control value to a predetermined iris threshold value to decide that the control value is out of the normal control range, or
   the malfunction judgment means compares the shutter speed control value to a predetermined shutter speed threshold value to decide that the control value is out of the normal control range.

2. The camera device as claimed in claim 1, wherein the iris means consists of an iris mechanism unit and an iris drive circuit, and
   the malfunction judgment means detects information on the output value of the iris drive circuit and decides a malfunction of the iris drive circuit according to the control value for the iris drive circuit and the output value of the iris drive circuit.

3. The camera device as claimed in claim 1, further comprising report means for reporting malfunction information on the judged malfunction.

4. The camera device as claimed in claim 3, further comprising malfunction position detection means for specifying means or a circuit which has been judged to have had the malfunction occurred,
   wherein malfunction information depending on the means or the circuit in which the malfunction occurred, is reported by the report means.

5. The camera device as claimed in claim 1,
   wherein the camera device is a monitoring camera device.

6. A monitor system comprising a camera device for detecting malfunction of an iris means for varying an incident light amount or shutter control means for varying a shutter speed of an imaging element and reporting malfunction information, and a monitor device for receiving the malfunction information from the camera device,
   wherein the monitor device includes malfunction information detection means for detecting the malfunction information, malfunction position determination means for determining the malfunction position from the malfunction information, and malfunction report means for reporting the malfunction,
   when the malfunction information detection means has detected a malfunction, the malfunction report means reports the malfunction to outside,
   wherein when the camera device detects the malfunction, the camera device switches a frequency of a color burst signal in an image signal from a first frequency to a second frequency or switches the burst signal between ON and OFF to report malfunction information to the monitor device, and
   the monitor device detects that the first frequency has been switched to the second frequency or presence/absence of the burst signal and reports the malfunction to outside by the malfunction report means.

7. The monitor system as claimed in claim 6, wherein the camera device periodically switches the burst signal between ON and OFF.

8. The monitor system as claimed in claim 6, wherein the camera device selects either one of switching a frequency of a color burst signal in an image signal from a first frequency to a second frequency and switching the burst signal between ON and OFF depending on the malfunction position.

\* \* \* \* \*